(12) United States Patent
Klann et al.

(10) Patent No.: US 12,103,887 B1
(45) Date of Patent: Oct. 1, 2024

(54) FOAMED GLASS BEADS AND PROCESS OF MAKING SAME

(71) Applicant: Revitri, LLC, Corpus Christi, TX (US)

(72) Inventors: Kenneth James Klann, Willernie, MN (US); Jason Cody Bates, Corpus Christi, TX (US)

(73) Assignee: REVITRI, LLC, Corpus Christi, TX (US)

( * ) Notice: Subject to any disclaimer, the term of this patent is extended or adjusted under 35 U.S.C. 154(b) by 9 days.

(21) Appl. No.: 18/453,167

(22) Filed: Aug. 21, 2023

(51) Int. Cl.
| | |
|---|---|
| C03C 11/00 | (2006.01) |
| C03B 19/06 | (2006.01) |
| C03B 19/08 | (2006.01) |
| C03B 19/10 | (2006.01) |
| C03C 1/00 | (2006.01) |
| C03C 12/00 | (2006.01) |

(52) U.S. Cl.
CPC .......... *C03C 11/007* (2013.01); *C03B 19/108* (2013.01); *C03C 1/006* (2013.01); *C03C 12/00* (2013.01)

(58) Field of Classification Search
CPC .............................. C03C 11/007; C03B 19/108
See application file for complete search history.

(56) References Cited

U.S. PATENT DOCUMENTS

| | | | | |
|---|---|---|---|---|
| 3,354,024 A * | 11/1967 | Eustachio | ............. | C03B 19/108 427/373 |
| 3,459,630 A * | 8/1969 | Eustachio | ............... | C03B 19/08 65/17.5 |
| 4,178,163 A * | 12/1979 | Wustefeld | ............... | C03C 11/00 501/12 |
| 4,225,443 A * | 9/1980 | Harris | ..................... | C03C 12/00 210/290 |
| 5,928,773 A * | 7/1999 | Andersen | .............. | C03C 11/007 428/317.1 |

(Continued)

FOREIGN PATENT DOCUMENTS

| | | |
|---|---|---|
| AU | 8213198 A | 1/1999 |
| CN | 1245153 A | 2/2000 |

(Continued)

OTHER PUBLICATIONS

EP-678482-A2 (Dennert) Oct. 25, 1995 (English language translation). [retrieved on May 28, 2024]. Retrieved from: Clarivate Analytics. (Year: 1995).*

(Continued)

*Primary Examiner* — Erin Snelting
(74) *Attorney, Agent, or Firm* — GRUMBLES LAW PLLC; Brittany Haanan (57) ABSTRACT

Foamed glass beads can be made from glass, a hydrated foaming agent, a hydrated binding agent, a sealing agent, a fluxing agent, and a solvent. The hydrated binding agent can hold the glass and the hydrated foaming agent in solution. The glass can be derived from glass cullet that is ground into powder. The glass powder, the hydrated foaming agent, the hydrated binding agent, the sealing agent, the fluxing agent, and the solvent can be mixed together to create a preform material that is pelletized to make preform pellets. The preform pellets can be dried and then heated to a predetermined temperature. The heating process can create the final, foamed glass beads.

26 Claims, 8 Drawing Sheets

(56) References Cited

U.S. PATENT DOCUMENTS

| | | | |
|---|---|---|---|
| 10,100,521 | B2 | 10/2018 | Tangeman et al. |
| 10,787,559 | B2 | 9/2020 | Monsheimer et al. |
| 2004/0016195 | A1 | 1/2004 | Archuleta |
| 2007/0186587 | A1 | 8/2007 | Dennert |
| 2008/0156038 | A1* | 7/2008 | Dennert ............... C03C 11/007 65/17.6 |
| 2014/0147664 | A1* | 5/2014 | Beall .................... C03B 19/066 428/338 |
| 2019/0135676 | A1 | 5/2019 | Neidhardt |
| 2020/0255629 | A1 | 8/2020 | Sahajwalla et al. |
| 2021/0101832 | A1 | 4/2021 | Rademan et al. |
| 2021/0300810 | A1* | 9/2021 | Wicks ..................... C03C 17/28 |
| 2022/0119309 | A1 | 4/2022 | Shiao et al. |

FOREIGN PATENT DOCUMENTS

| | | | |
|---|---|---|---|
| CN | 102001832 | A | 4/2011 |
| CN | 102581926 | A | 7/2012 |
| CN | 107417125 | A * | 12/2017 |
| DE | 102014003258 | A1 | 9/2015 |
| EP | 678482 | A2 * | 10/1995 ............... C03B 1/02 |
| EP | 3181527 | A1 | 6/2017 |
| JP | S589833 | A | 1/1983 |
| JP | H09124378 | A | 5/1997 |
| JP | 2003041717 | A | 2/2003 |
| JP | 2013202421 | A | 10/2013 |
| KR | 200333942 | Y1 | 11/2003 |
| KR | 102161575 | B1 | 10/2020 |
| KR | 20220128739 | A | 9/2022 |
| KR | 20230091459 | A | 6/2023 |
| WO | 2021069929 | A1 | 4/2021 |

OTHER PUBLICATIONS

CN-107417125-A (Zhu) Dec. 1, 2017 (English language translation). [retrieved on May 28, 2024]. Retrieved from: Clarivate Analytics. (Year: 2017).*
Aero Aggregrates of North America, LLC, https://www.aeroaggna.com/new-page, accessed Aug. 21, 2023.
AGSCO Corp, Foamed Glass Spheres, https://www.agsco.com/foamed-glass-spheres/, accessed Apr. 5, 2022.
AGSCO Corporation, Foamed Glass Spheres, Safety Data Sheet.
AGSCO Corporation, Foamed Glass Spheres, Technical Data Sheet, 2021.
BPN International, Expanded glass beads, https://bpn-international.com/expanded-glass-beads/, accessed Aug. 21, 2023.
Foam Glass Aggregates, https://foamglassaggregates.com/learn.html, accessed Aug. 21, 2023.
Material Sample Shop.Com, Expanded Glass Beads—Lightweight beads with good thermal insulation properties, https://www.materialsampleshop.com/products/expanded-glass-beads, accessed Aug. 21, 2023.
PORAVER GMBH, poraSpheres, Hollow Glass Microspheres, https://poraver.com/us/, accessed Aug. 21, 2023.
PORAVER, Poraver Expanded Glass, Technical Data Sheet, https://poraver.com/us/poraver/, accessed Apr. 22, 2022.
Schlusselbauer Geomaterials, Geomaterials Foam Glass, version May 2023.

* cited by examiner

Standard Aggregate

Figure 4b

Engineered Aggregate

FOAMED GLASS BEADS AND PROCESS OF MAKING SAME

FIELD OF THE DISCLOSURE

This disclosure relates to foamed glass beads and, more particularly, relates to an improved composition of, and process for making, foamed glass beads.

BACKGROUND

Foamed glass beads are used in concrete aggregate to improve insulation, decrease weight of materials, which is useful for transportation of said materials, and to allow for faster build time. However, the current compositions and processes of manufacture create limitations to the size and strength of existing beads. An improved composition and method of manufacture is needed to increase the compressive strength of foamed glass beads and to allow for a wider range of sizes.

SUMMARY

This disclosure relates to foamed glass beads and, more particularly, relates to an improved composition of, and process for making, foamed glass beads for use as aggregate and other applications. In one aspect, the disclosure provides foamed glass beads made from glass; a hydrated foaming agent; a hydrated binding agent; a sealing agent; a fluxing agent; and a solvent. The glass can be derived from glass cullet that is ground into glass powder. The hydrated binding agent can hold the glass and the hydrated foaming agent in solution. The glass powder, the hydrated foaming agent, the hydrated binding agent, the sealing agent, the fluxing agent, and the solvent can be mixed together to create a preform material that is pelletized to make preform pellets. The preform pellets can be held together by the binding agent, and the preform pellets can be dried and then heated to a predetermined temperature. The sealing agent can create a barrier throughout the preform pellets to limit migration of soluble and insoluble constituents while allowing solvent and vapor from the solvent to escape during the drying process. The fluxing agent can lower a melting temperature of the glass powder, create a seal around the glass powder and the hydrated foaming agent, and assist the glass powder in joining together once melted. The binding and sealing agent may burn off during the heating process and, during the heating process, the fluxing agent and the foaming agent can be incorporated into the glass. The heating process can create the final, foamed glass beads.

The above summary is not intended to describe each and every example or every implementation of the disclosure. The description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which.

DETAILED DESCRIPTION

The present disclosure relates to foamed glass beads and, more particularly, relates to an improved composition of, and process for making, foamed glass beads. Various embodiments are described in detail with reference to the drawings, in which like reference numerals may be used to represent like parts and assemblies throughout the several views. Reference to various embodiments does not limit the scope of the system and methods disclosed herein. Examples of construction, dimensions, and materials may be illustrated for the various elements, and those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Figure 1:
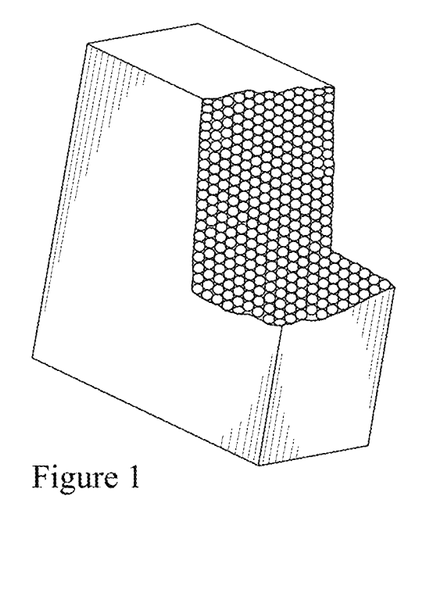
FIG. 1 illustrates a cross-sectional view of a slab of concrete incorporating foamed glass beads.

FIG. 1 illustrates a cross-sectional view of a slab of concrete incorporating foamed glass beads. In use, foamed glass beads can be added to concrete to increase the insulation properties of the concrete aggregate, increase the strength of the concrete, decrease dry time of the concrete to allow for faster build times, and decrease the weight of the overall aggregate to allow for more efficient transportation of building materials to build sites (for example, a cubic yard of concrete can weight from 3,750 to 4,050 pounds whereas a cubic yard of concrete with foamed glass beads can weigh from 1,530 to 2,120 pounds).

Figure 2:
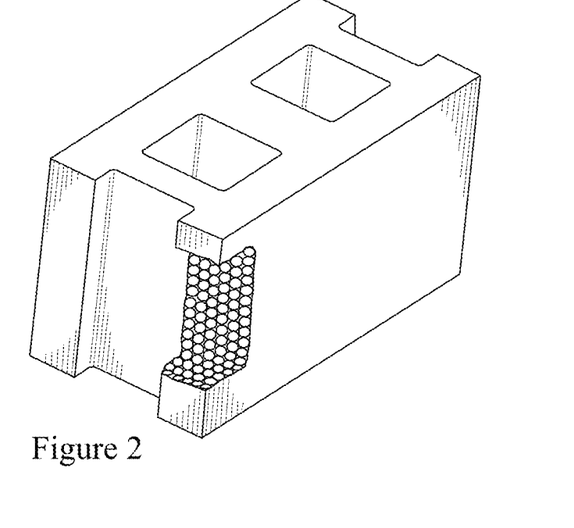
FIG. 2 illustrates a cross-sectional view of a block of concrete incorporating foamed glass beads.
Figure 3:
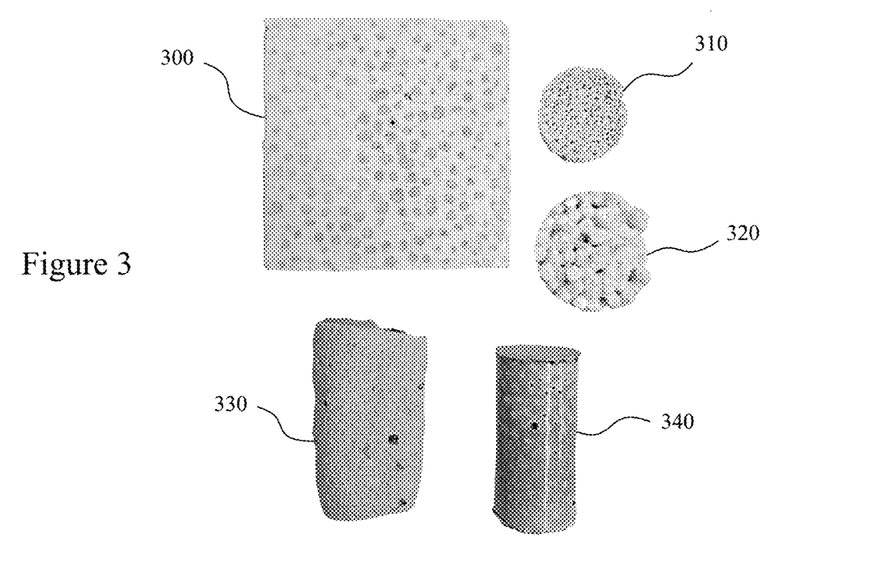
FIG. 3 illustrates embodiments of the foamed glass beads in various matrices.
Figure 4A:
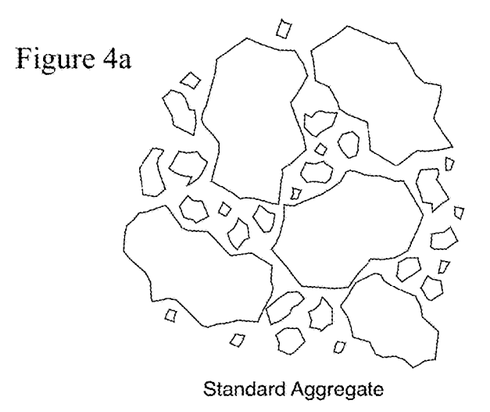
FIG. 4a illustrates a cross-sectional view of a standard aggregate.
Figure 4B:
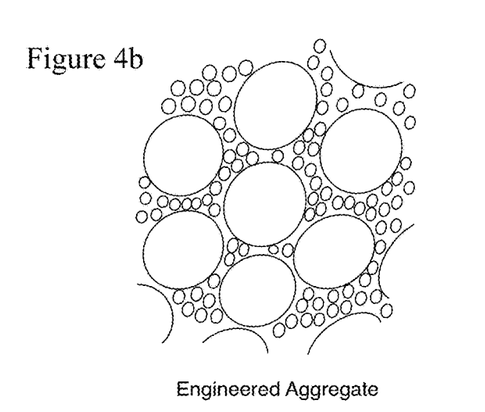
FIG. 4b illustrates a cross-sectional view of the improved engineered aggregate including the disclosed foamed glass beads.
Figure 5A:
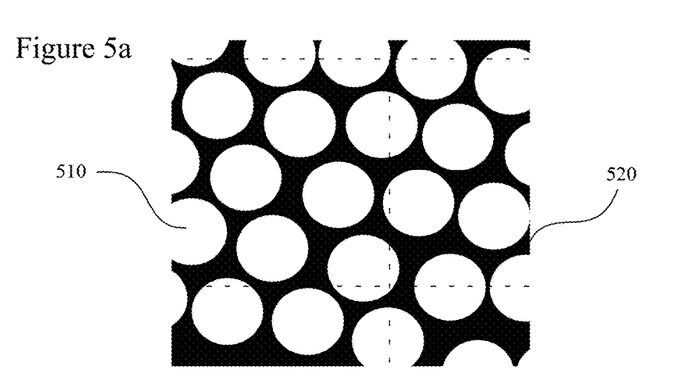
FIG. 5a is a cross-sectional schematic of a portion of a foamed glass bead illustrating voids and walls
Figure 5B:
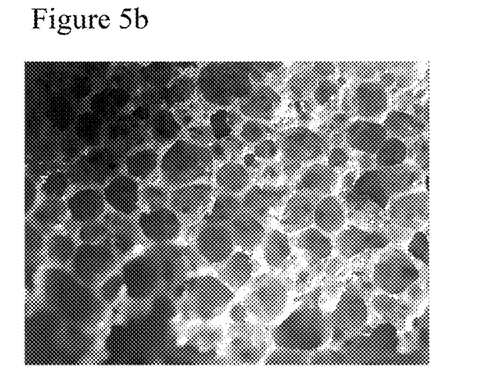
FIG. 5b is an image of a portion of a foamed glass bead illustrating voids and walls of a low density bead of approximately 0.5 specific gravity.
Figure 5C:
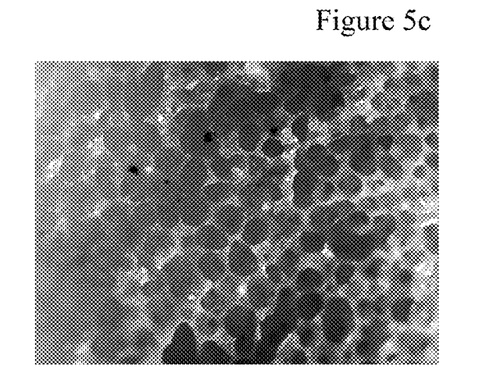
FIG. 5c is an image of a portion of a foamed glass bead illustrating voids and walls of a medium density bead of approximately 1.0 specific gravity.
Figure 6:
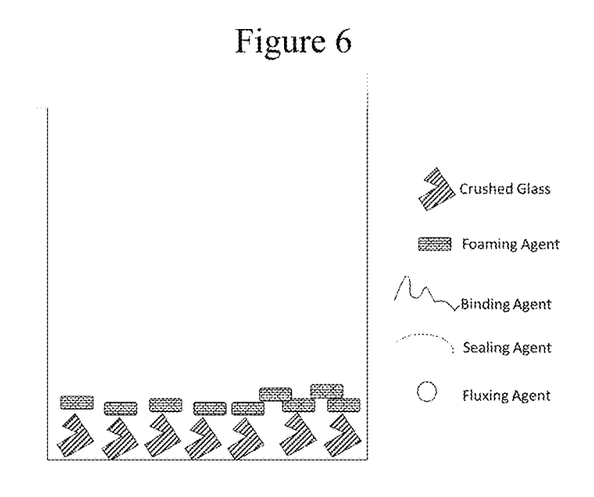
FIG. 6 illustrates how the components of foamed glass beads interact when a binding agent is not present.
Figure 7:
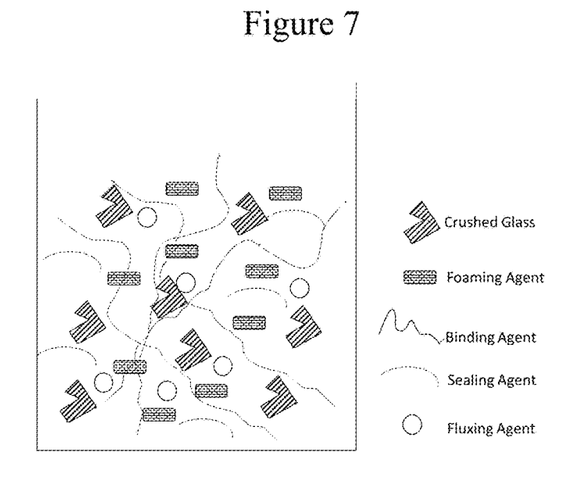
FIG. 7 illustrates how the components of foamed glass beads are suspended in a solvent by the binding agent prior to heating.
Figure 8:
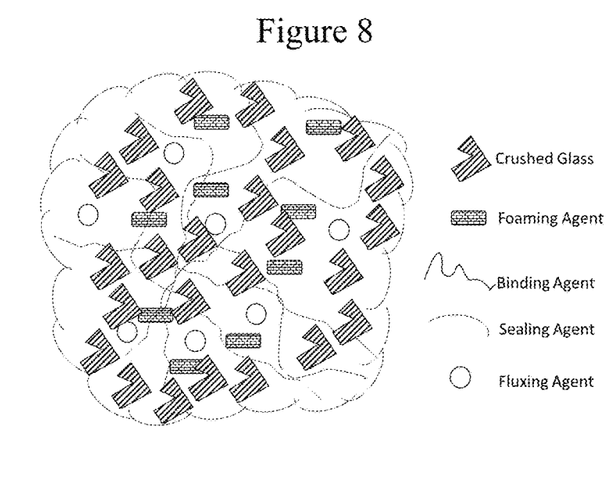
FIG. 8 illustrates how the components of foamed glass beads are held in place by a sealing agent while the solvent is removed.
Figure 9:
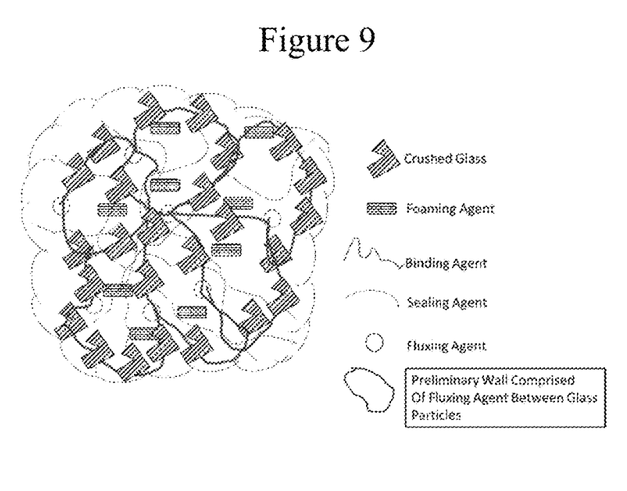
FIG. 9 illustrates the fluxing agent of foamed glass beads undergoes thermal transformation during initial stages of heating to create a seal around the remaining components.
Figure 10:
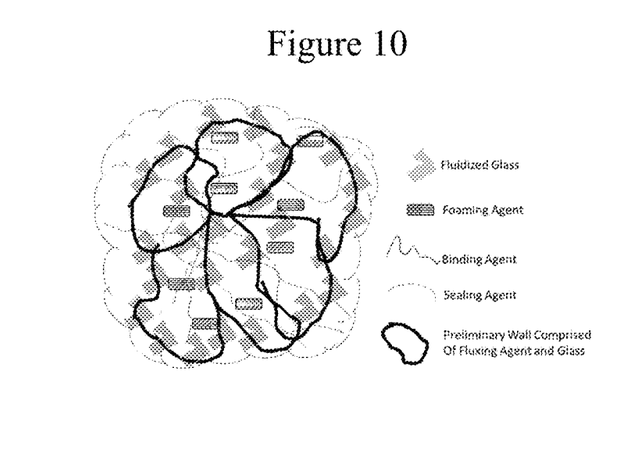
FIG. 10 illustrates the glass particles softening during later stages of heating and adhering to other glass particles along the sealed borders created by the fluxing agent.
Figure 11:
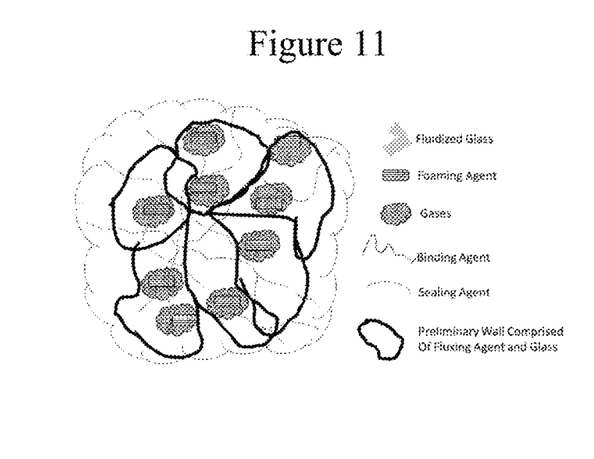
FIG. 11 illustrates the creation of gas and bubble via decomposition of the foaming agent during later stages of heating.
Figure 12:
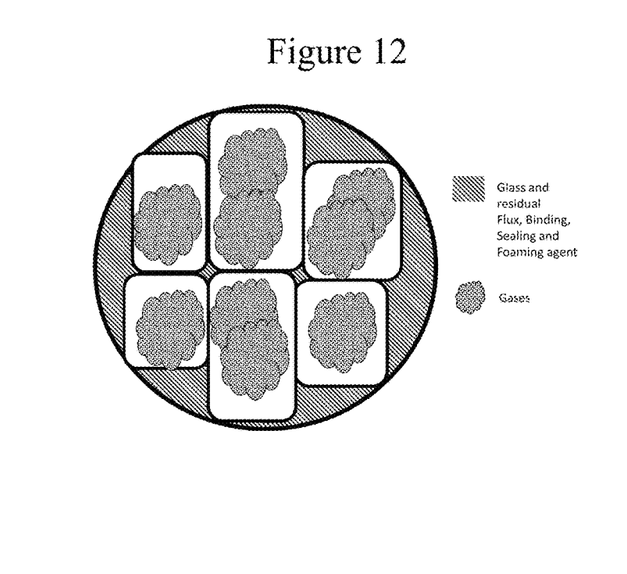
FIG. 12 illustrates the expanded gasses, more uniformly shaped voids, and the incorporation of the remaining components with the glass during later stages of heating.
Figure 13:
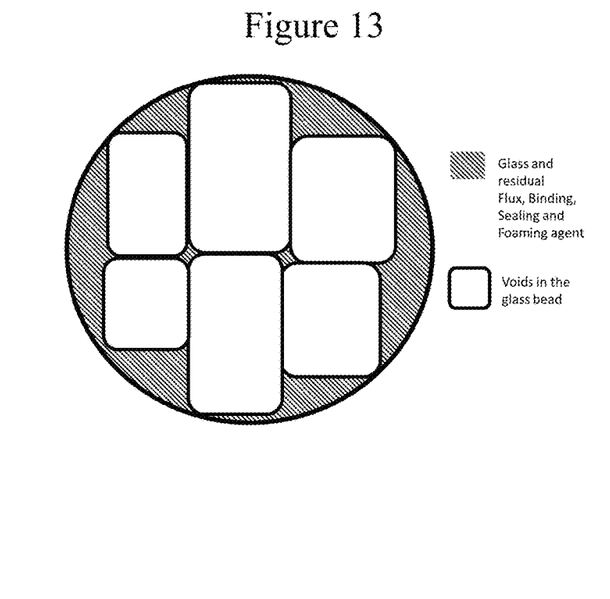
FIG. 13 illustrates the post-heating structure of foamed glass beads having glass matrices and internal voids.
Figure 14:
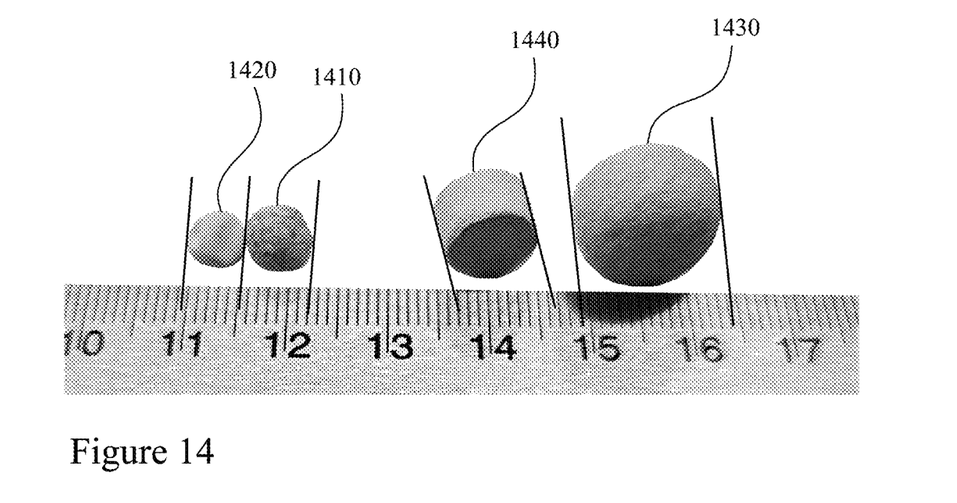
FIG. 14 illustrates pre- and post-heated beads of different sizes.
Figure 15:
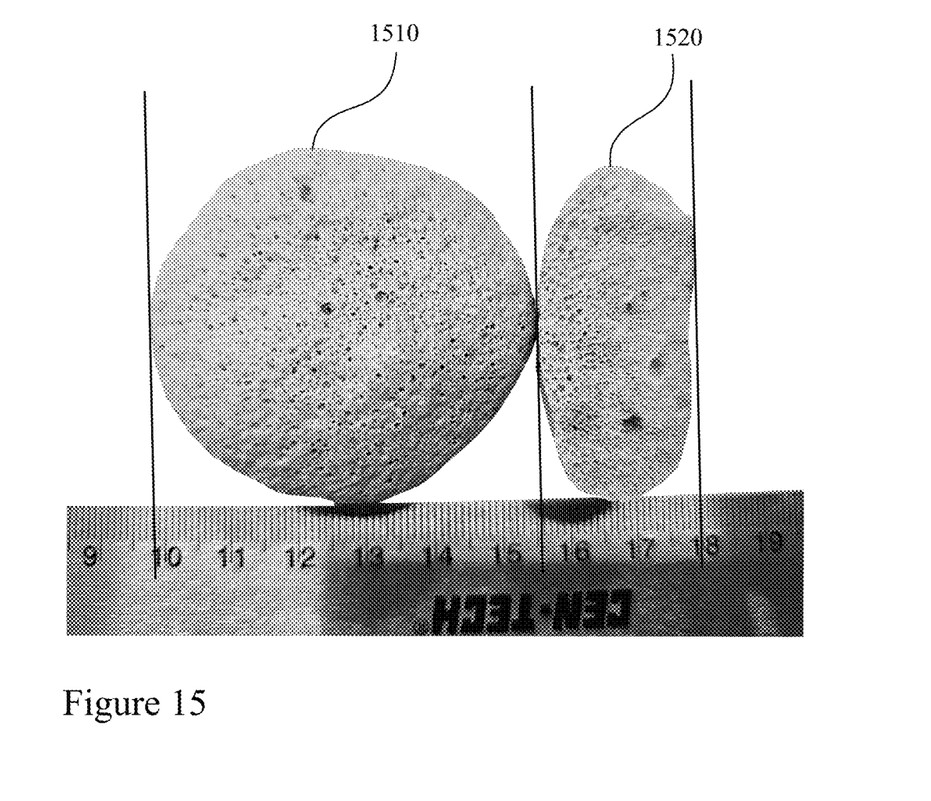
FIG. 15 illustrates a top and side view of a foamed glass bead that is irregularly shaped, has open, external structures, and has variably-sized, internal voids.
Figure 16:
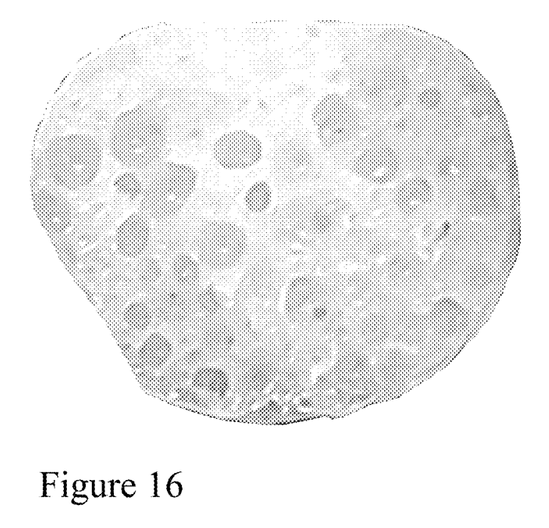
FIG. 16 is a cross-sectional view of a foamed glass bead illustrating the glass matrix and voids present in the internal structure.
Figure 17:
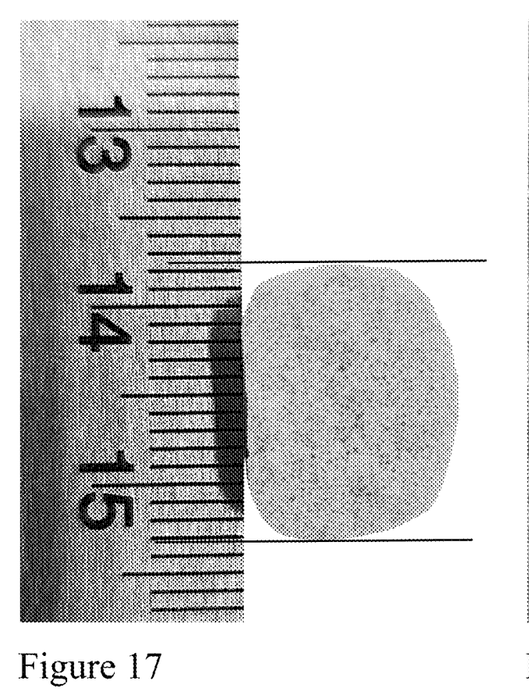
FIG. 17 is a cross-sectional view of a foamed glass bead illustrating the glass matrix and voids present in the internal structure.
Figure 18:
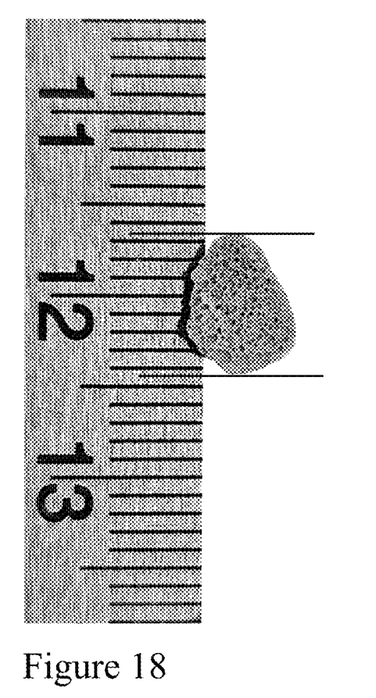
FIG. 18 is a cross-sectional view of a foamed glass bead illustrating the glass matrix and voids present in the internal structure.
Figure 19:
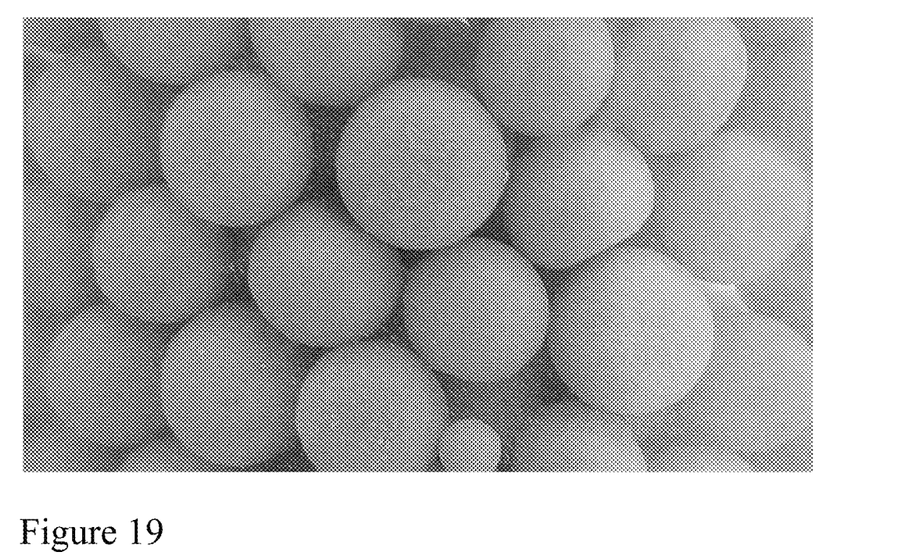
FIG. 19 illustrates a closely-packed group of foamed glass beads.
Figure 20:
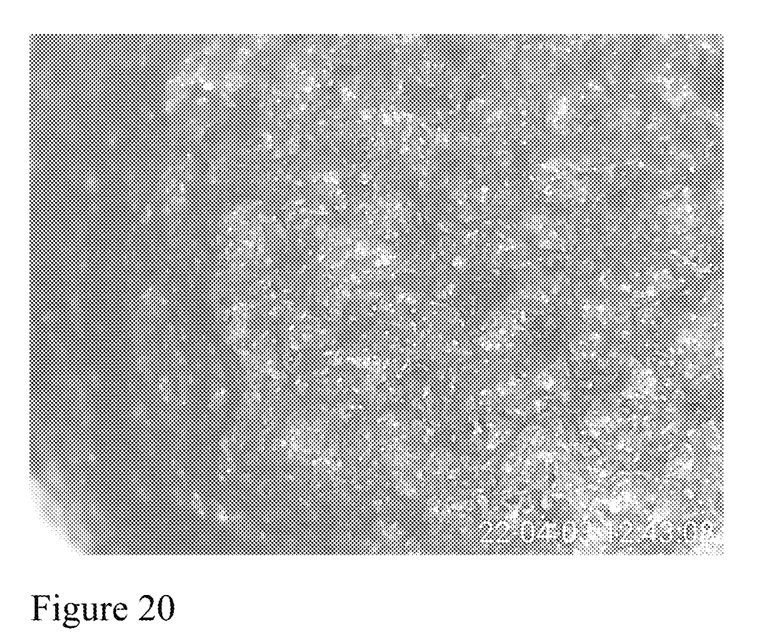
FIG. 20 illustrates the texture of the surface of a foamed glass bead.
Figure 21:
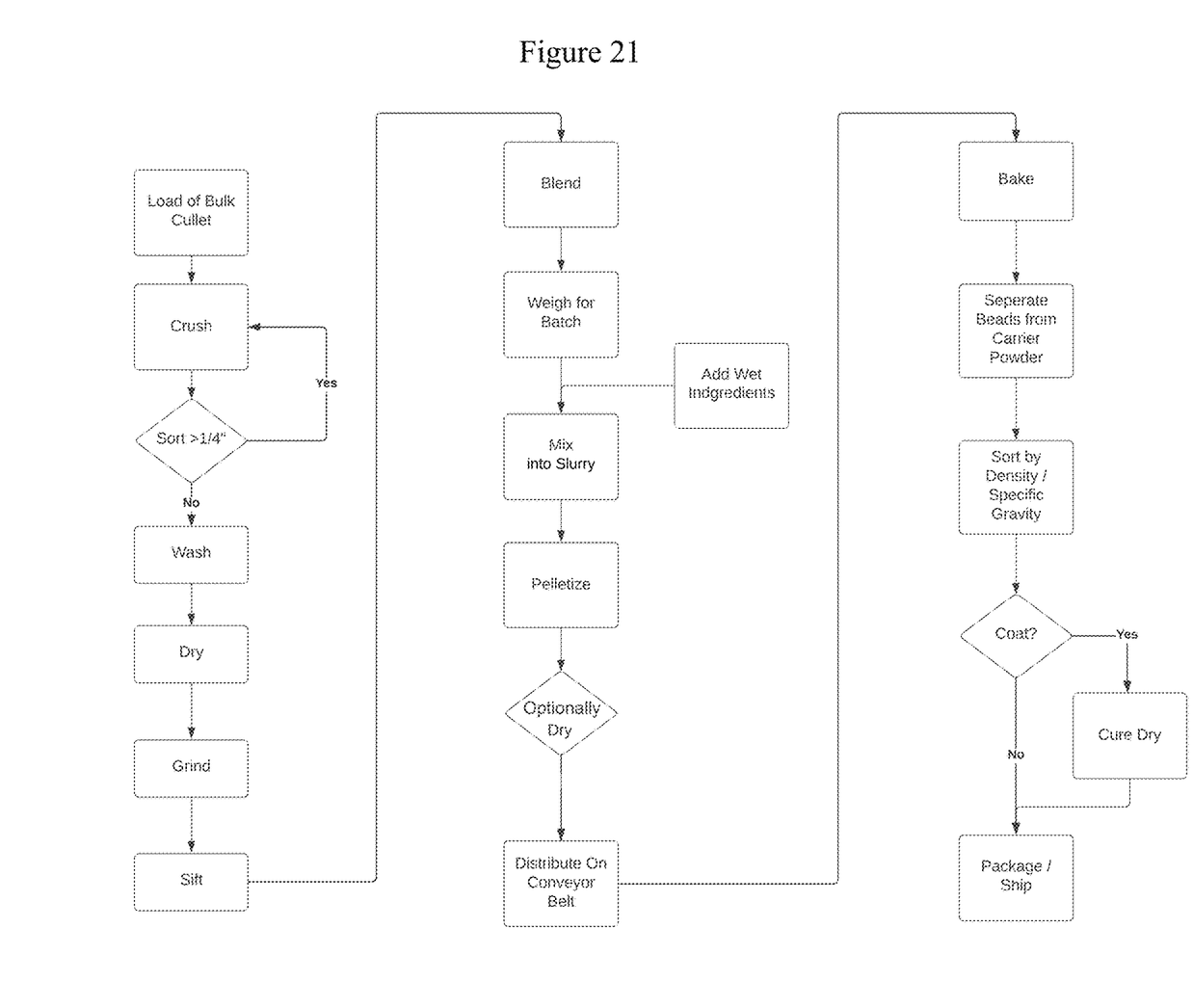
FIG. 21 is a flow diagram for process of creating the foamed glass beads.

Additional views of the bead are provided. FIG. 2 illustrates a cross-sectional view of a block of concrete incorporating foamed glass beads. FIG. 3 illustrates embodiments of the foamed glass beads in various matrices (polymer foam matrix 300, non-foamed polymer matrix 310, beads adhered to each other using an epoxy adhesive 320, a polymer foam loaf 330, and a cement matrix 340). FIG. 4a illustrates a cross-sectional view of a standard, prior art aggregate. FIG. 4b illustrates a cross-sectional view of the improved engineered aggregate including the disclosed foamed glass beads. FIG. 5a is a cross-sectional schematic of a portion of a foamed glass bead illustrating voids 510 and walls 520. FIG. 5b is an image of a portion of a foamed glass bead illustrating voids and walls of a low-density bead of approximately 0.5 specific gravity. FIG. 5c is an image of a portion of a foamed glass bead illustrating voids and walls of a medium-density bead of approximately 1.0 specific gravity. FIG. 6 illustrates how the components of foamed glass beads interact when a binding agent is not present. FIG. 7 illustrates how the components of foamed glass beads are suspended in a solvent by the binding agent prior to heating. FIG. 8 illustrates how the components of foamed glass beads are held in place by a binding agent while the solvent is removed. FIG. 9 illustrates the fluxing agent of foamed glass beads undergoes thermal transformation during initial stages of heating to create a seal around the remaining components. FIG. 10 illustrates the glass particles softening during later stages of heating and adhering to other glass particles along the sealed borders created by the fluxing agent. FIG. 11 illustrates the creation of gas and bubble via decomposition of the foaming agent during later stages of heating. FIG. 12 illustrates the expanded gasses, more uniformly shaped voids, and the incorporation of the remaining components with the glass during later stages of heating. FIG. 13 illustrates the post-heating structure of foamed glass beads having glass matrices and internal voids. FIG. 14 illustrates pre- and post-heated beads of different sizes. FIG. 15 illustrates a top and side view of a foamed glass bead that is irregularly shaped, has open, external structures, and has variably sized, internal voids. FIGS. 16-18 are cross-sectional views of foamed glass beads illustrating the glass matrix and voids present in the internal structure. FIG. 19 illustrates a closely packed group of foamed glass beads. FIG. 20 illustrates the texture of the surface of a foamed glass bead. FIG. 21 is a flow diagram for process of creating the foamed glass beads.

Generally, the bead can have a surface skin layer and a porous interior. More specifically, the bead can include glass, a foaming agent, a binding agent, a sealing agent, a fluxing agent, and a solvent. The foaming agent can be a hydrated foaming agent. Similarly, the binding agent can be a hydrated binding agent that holds the glass and the hydrated foaming agent in solution. Generally, the glass powder, the hydrated foaming agent, the hydrated binding agent, the sealing agent, the fluxing agent, and the solvent can be mixed together to create a preform material that is pelletized to make preform pellets. The preform pellets can then be baked. The composition of the preform pellets prior to baking can primarily include glass that is 93.3% to 99.6% by weight, a foaming agent that is, pre-hydration, between 0.31% and 4.67% by weight, a binding agent that is, pre-hydration, between 0.062% and 1.17% by weight, a sealing agent that is between 0% and 0.56%, and a fluxing agent that is between 0.01% and 0.3% by weight.

In alternative embodiments, the bead can include glass, a void proxy comprised of a foaming agent and a fluxing agent, water, and a binder. The general process of creation involves mixing the void proxy, water, and binder together to make preform pellets. The preform pellets can then be baked. The composition of the preform pellets prior to baking can primarily include a void proxy that is between 0.25% and 1% by weight (for example, 0.5%), water that is between 30% and 50% by weight (for example, 40%), a binder that is less than 1% by weight, and powdered glass that is between 40% and 60% by weight.

In addition to a unique composition of foamed glass beads, the process in which to make them is also unique and novel. More specifically, the process involves the steps of hydrating a foaming agent, hydrating a binding agent, mixing a glass powder with the hydrated foaming agent and the hydrated binding agent to create a premix, adding solvent to the premix and mixing to create a flowable preform mixture, mixing a sealing agent into the flowable preform mixture, wherein the sealing agent dissolves and mixes between particles, mixing a fluxing agent into the flowable preform mixture to create a pre-foamed bead paste, pelletizing the pre-foamed bead paste to make preform pellets or beads, heating the preform pellets/beads until particles of the glass powder from the preform pellets are sintered together and the preform pellets become molten beads, and removing the molten beads from the heat to cool them into foamed glass beads.

In alternative embodiments, the process involves the steps of adding a foaming agent to a fluxing agent to create a void proxy, drying the void proxy, crushing the void proxy into a powder, adding water to the powdered void proxy and mixing to create a primary preform mixture, mixing a glass powder into the primary preform mixture to make a secondary preform mixture, mixing a binder into the secondary preform mixture to create a final preform mixture, pelletizing the final preform mixture to make preform pellets, heating the preform pellets until particles of the glass powder from the preform pellets are sintered together and the preform pellets become molten beads, and removing the molten beads from the heat to cool them into foamed glass beads. The specifics of the composition and process are outlined below.

The beads can be roughly spherical but are not limited to that shape. For example, the beads can be oblong, cylindrical, or irregularly shaped, as illustrated in FIG. 15 by beads 1510 and 1520. The beads can also be a range of sizes, as illustrated in FIG. 14. For example, they may be fractions of millimeters in diameter (ex: a 0.1 mm bead, a 7 mm bead 1410 created from a preform pellet 1420 heated to, and held at, 950 degrees Celsius for 15 minutes) or may be several centimeters in diameter (ex: a 15 mm bead 1430 created from a 10 mm preform pellet 1440 heated to, and held at, 950 degrees Celsius for 15 minutes). The size of the final, foamed glass bead can be determined by the mass of premix used, the relative concentrations of the constituents, and the rate and duration of heating of the preform pellets.

Generally, a cross-section of the beads reveals that their interior structures are comprised of a series of voids surrounded by walls, as illustrated in FIGS. 5 and 15-18. The shape of the voids may be round, oval, rounded squares, or irregularly shaped. The voids may be equal in size and distribution or may be denser (i.e., have smaller, more numerous voids) in some locations compared to others, as illustrated in FIG. 15 where there is variably sized voids in the interior structure of beads 1510 and 1520. This offset density may occur due to uneven heating. The voids can be created by off-gassing of the thermal decomposition of the foaming agent during heating. Additional constituents may undergo chemical and/or physical changes that also contribute to the off-gassing. The walls that surround the voids are comprised of sintered glass and any remaining solid constituents that are left after thermal decomposition during heating of the beads.

While the foamed glass beads are generally described herein as being spherical with evenly distributed internal voids, the size of the beads, their density, and their compressive strength can be determined, and adjusted, by the mass of premix used per bead, the relative concentrations of constituents (glass, foaming agent, binding agent, sealing agent, fluxing agent, solvent, etc.) in the formulation, the processing parameters for the beads, and the process of forming the beads. The processing conditions, such as heating, can impact the void size inside the foamed glass beads, the amount of foaming that occurs, and the compressive strength of the foamed glass beads. Generally, preform pellets heated for a shorter period of time are more fragile and have smaller void sizes whereas pellets heated up to the target temperature of 800-1000 degrees Celsius are more structurally sound and have larger and more regular voids. FIG. 17 illustrates a 16 mm bead heated at 950 degrees Celsius for fifteen minutes. FIG. 18 illustrates an 8 mm bead heated at 950 degrees Celsius and then removed from heat. The shape of the final foamed glass beads may be dictated in part by their size and in part by their initial form. Specifically, smaller beads can tend to take a variety of shapes and result in approximately spherical foamed glass beads whereas larger beads may be more constrained by their initial shape.

The glass can be derived from glass cullet that is ground into a fine glass powder of a predetermined size or sizes. In some cases, the mesh size may be up to 120 mesh. In other embodiments, the mesh size can range from 250 to 400 mesh. The glass can be soda-lime glass that is recycled from food and beverage packaging. Soda-lime glass is chemically inert and has high compressive strength, which is useful for inclusion in concrete. However, when soda-glass is ground into cullet and finer particles, it has an irregular shape, as illustrated in FIG. 4a, which can present problems during certain types of use. One way to address this is to increase the ratio of cement to glass, however that increases the cost and weight of the final concrete mix and decreases the overall strength of the cured structure. An alternative solution is to convert the glass cullet to shapes that are more rounded. However, since the energy required to melt pure glass is high, this additional step is not efficient.

As proposed below, glass cullet can be efficiently turned into an aggregate and reformed into spherical shapes while retaining many of the beneficial properties of glass. More specifically, recycled glass can be powdered, converted to an aggregate, and baked using high heat for a short period of time. The high heat sinters and melts a powdered glass preform into a foamed bead of varying density, but generally ranging from 0.05 g/cm3 to that of solid glass, 2.6 g/cm3 (for example, 1 gram/cm3) while providing high compressive strength (3,000 psi to 30,000 psi or higher). This final, foamed glass bead can be added to concrete to produce the desired effects outlined above. Prior to heating/baking, the powdered glass can be between 93.3% and 99.6% (for example, 96.5% to 99.2%) by weight of the preform pellet.

Embodiment 1

As mentioned above, the interior of the foamed glass beads can be characterized by voids surrounded by walls of a solid matrix, as illustrated in FIG. 5a. FIG. 5b shows a lower density bead (0.5 specific gravity) where the voids take on a honeycomb-like appearance due to the higher ratio of voids (entrapped gas) to glass matrix. FIG. 5c shows round voids (entrapped gas) that are typical of a lower void to glass matrix ratio (1.0 specific gravity).

One embodiment of the aggregate that makes up the foamed glass beads can include powdered glass (as described above), a hydrated foaming agent, a hydrated binding agent, a sealing agent, a fluxing agent, and a solvent. The glass can be derived from glass cullet that is ground into glass powder. That glass powder can be combined with the hydrated foaming agent, the hydrated binding agent, the sealing agent, the fluxing agent, and the solvent to create a preform material. The preform material can then be pelletized to make preform pellets. The hydrated binding agent can hold the glass and the hydrated foaming agent in solution as well as holding the preform pellets together while they are (optionally) dried. During the drying process, the sealing agent can create a barrier throughout the preform pellets to limit migration of soluble and insoluble constituents while allowing the solvent and vapor from the solvent to escape. Once the preform pellets are dried, they are then heated to a predetermined temperature (for example, 950 degrees Celsius). The addition of the fluxing agent to the preform pellets helps to lower the melting temperature of the glass powder. It also creates a seal around the combined glass powder and hydrating foaming agent, and it assist the glass powder in joining together once the powder particles are melted. During heating, the hydrated binding agent and the sealing agent are burned off, while the fluxing agent and hydrated foaming agent are incorporated into the glass powder. After heating is completed, the foamed glass beads result.

As mentioned above, the foaming agent can be a hydrated foaming agent. More specifically, a solvent (for example, water) can be added to a foaming agent to hydrate it until it creates a thick paste. In some cases, the hydrated foaming agent can be a metal-coordinated silicate such as, but not limited to, bentonite, an absorbent clay. Bentonite clay can create a thick, viscose emulsion that suspends and separates the glass particles, which can then create a homogenous free-flowing mixture, which is ideal for dispensing or forming the preforms. In other embodiments, salts where the anion or cation can thermally decompose giving off a volatile compound or gas could be used such as, but not limited to, mono-, di-, and tri-valent salts of carbonates (such as Lithium Carbonate), Nitrates, azides, or other anions that thermally decompose. Volatile anions such as salts of ammonia could also be used. Organic compounds that are volatile or that thermally decompose/combust at the temperatures described herein may also provide the gas to form the voids. Further, alternative clays (for example, Kaolin) may be used instead of bentonite. As mentioned above, the hydrated foaming agent may become dehydrated during the drying process, which can occur before heating.

The purpose of the hydrated foaming agent is to decompose during heating (for example, when temperatures are between 600 and 700-degrees Celsius) to create gas bubbles within the glass matrix, as illustrated in FIG. 11. These gas bubbles can then migrate to pockets of air within the preform pellets and can enlarge those pockets of air into bubbles/voids. As the gas expands during later heating stages (450-1000 degrees Celsius), the voids become more uniform, as illustrated in FIG. 12, and the glass particles form walls around the voids. Additionally, as described in more detail below, the fluxing agent, foaming agent, sealing agent, and binding agent are either burned off or become incorporated into the glass. Then, as the bead is removed from its heat source and cools, the glass matrix anneals and the structure becomes hard, as illustrated in FIG. 13. The internal structures reinforce the external surface.

More specifically, pockets of air can be created and/or derived from the incorporation of the glass powder with a fluxing agent. While the pockets of air can be prevented from migrating due to the sealing agent, the gas bubbles created from the decomposed foaming agent may be able to migrate to, and expand the size of, the pockets of air to create the larger bubbles/voids within the molten pellets. Due to the incorporation of the hydrated foaming agent through the preform pellets, the final foamed glass beads can have evenly distributed bubbles after they have cooled. The foaming agent, pre-hydration, can comprise between 0.31% and 4.67% (for example, 0.6% to 2.4%) by weight of the preform pellet prior to heating/baking.

In addition to the foaming agent, the foamed glass beads can be comprised of a binding agent. Similar to the foaming agent, the binding agent may also be hydrated. For example, a solvent (for example, water) can be added to a binding agent to hydrate it until it creates a thick paste. In some embodiments, the hydrated binding agent can be comprised of a sugar such as, but not limited to, xanthan gum, guar gum, polysaccharides, poly-ol sugar alcohols, and combinations thereof. The hydrated binding agent may also be comprised of non-sugar gelling agents (ex: calcium alginate) as well, provided they are capable of holding insoluble materials in place in three-dimensional space. Other materials that may function as a binding agent include, but are not limited to, agar, gelatin, agarose, polyacrylamide, and combinations thereof. As mentioned above, the hydrated binding agent may become dehydrated during the drying process, which can occur before heating. The hydrated binding agent can burn off completely during heating. Alternatively, portions (or all of the binding agent) can combine with the molten preform during heating. The binding agent, pre-hydration, can comprise between 0.062% and 1.17% (for example, 0.12% to 0.6%) by weight of the preform pellet prior to heating/baking.

The purpose of the binding agent is to hold the insoluble components (i.e., the glass and foaming agent) in solution. As illustrated in FIG. 6, inclusion of only glass and a foaming agent in a solution (without the binding agent) results in those constituents settling out of solution and makes formation of a foamed glass bead difficult. Therefore, addition of a binding agent enables the constituents to remain suspended in the solvent and held in a three-dimensional position during the pre-foamed bead-forming process, as illustrated in FIG. 7.

As mentioned in more detail below, the hydrated foaming agent and the hydrating binding agent can be mixed with the glass powder to create a premix paste. Once the premix paste is prepared, a solvent (for example, water) can be added and mixed to create a flowable preform mixture. Fluidity can be better controlled by pre-hydrating the foaming agent and the binding agent. The solvent can comprise between 20.0% and 50.0% (for example, 30.0% to 37.6%) by weight of the preform pellet prior to drying and heating/baking.

Once the preform is flowable, a sealing agent can be added and mixed until it dissolves and mixes between particles. In some embodiments, the sealing agent can be an adhesive compound such as, but not limited to, a combination of polyvinyl acetate, ethanol, water, and acetate. In other embodiments, the sealing agent can be an alginate gel such as, but not limited to, a combination of sodium alginate and calcium chloride solutions that are mixed together. The sealing agent can comprise between 0% and 0.56% (for example, 0% to 0.29%) by weight of the preform pellet prior to heating/baking.

The sealing agent can help hold the preform pellets together and can create a barrier throughout of the preform pellet to limit migration of soluble and insoluble constituents, while allowing water and/or water vapor to escape the preform pellets. Further, the scaling agent can hold the suspended solids (ex: the foaming agent, fluxing agent, and other soluble and insoluble constituents) in the bead and prevent those solids from migrating to the edge of preform pellets as the pellets air dry prior to baking and the solvent leaks out and/or evaporates, as illustrated in FIG. 8. This helps to enable each preform pellet to retain an even distribution of the foaming agent throughout its volume which, in turn, allows the foaming agent to contribute to foaming the bead instead of simply outgassing into the air from the surface of the molten bead. Without the sealing agent, the foaming agent and soluble fluxing agent may migrate to the outside of the preform bead and no longer be evenly dispersed throughout the bead when it is heated. Therefore, the desired low bead density and high number of the bubbles/voids within each foamed glass bead can be achieved by incorporating the sealing agent. In some cases, the sealing agent can partially or entirely burn off during the heating of the beads.

In addition to mixing the sealing agent in to the flowable preform mixture, a fluxing agent can be mixed into the flowable preform mixture to create a final, pre-foamed bead paste, which can range in consistency from a highly flowable liquid (i.e., a material that can be sprayed from a nozzle to form fine, sand-like beads) to a thick, doughy paste (i.e., material that can be used to form beads between a few mm in diameter and several centimeters). The order of incorporation of materials can be important. For example, after creating the flowable preform, some embodiments function best if the sealing agent is incorporated into the preform (i.e., dissolved and mixed between particles), followed by incorporation of the fluxing agent. This enables the sealing agent to graft the fluxing agent evenly throughout the bead during the drying and/or heating process. The fluxing agent can contain boron, creating a borosilicate glass upon heating of the preformed pellets. For example, the fluxing agent can be, but is not limited to, sodium borate, sodium tetraborate, disodium tetraborate, and combinations thereof. The fluxing agent can comprise between 0.01% and 0.3% (for example, 0.02% to 0.15%) by weight of the preform pellet prior to heating/baking.

As mentioned above, prior to heating/baking, the fluxing agent can congeal the sealing agent in its dispersed composition to ensure the preform pellet retains its constituents in their desired, suspended configuration. During the initial heating stages (i.e., from 500-750 degrees Celsius), the fluxing agent can undergo thermal transformation (i.e., it can melt) and create a seal around particles such as the crushed glass and foaming agent, effectively replacing the function of the binding agent by joining the glass particles together. As illustrated in FIG. 9, the fluxing agent can create a preliminary wall between the glass particles and create an airtight bubble. During the later heating stages (i.e., from 650-1000 degrees Celsius), the glass particles further soften and adhere to each other along the borders created by the flux, as illustrated in FIG. 10. Therefore, as the preform pellets are heated, the binding agent burns off, the fluxing agent melts and joins glass particles together, the fluxing agent lowers the melting point of the glass, and as the glass dissolves, the fluxing agent helps merge the glass particles together until the glass is a homogenous skin/bubble. The foaming agent can then give off gas and inflate the molten beads further.

The size of particles and/or amounts of the fluxing agent can determine the size and/or number of the gas bubbles/pockets within the final, foamed glass beads. Therefore, to increase the number of voids/nucleating sites within each foamed glass bead, more fluxing agent can be added to the preform pellets. The appropriate, corresponding amount of a foaming agent can then inflate the voids/nucleating sites to generate the desired density of the foamed glass bead. If no foaming agent is used, then the desired density and number of bubbles can be achieved if the size of the fluxing agent particles are the same size as the desired air pockets and the proper amount of fluxing agent is used. Additionally, the fluxing agent can function to lower the melting point at which the glass powder necks, and it can form an encapsulating bubble around the nucleating sites it creates.

As mentioned above, prior to heating into a final, foamed glass bead, preform pellets can be created. The preform pellets can be made from the combination of the glass powder, the hydrated foaming agent, the hydrated binding agent, the scaling agent, the fluxing agent, and the solvent, which are mixed together to form the pre-foamed bead paste and then formed into pellets (i.e., pelletized). In this disclosure, preform pellets simply refers to preform material that has been separated into individual structures prior to heating such as pellets, beads, sprayed droplets, or any other shape. For example, as illustrated in FIG. 14, preform pellets can be bead shaped 1420 or pellet shaped 1440. Once heated, the preform pellets typically take on a rounded shape, as illustrated by the heated bead 1410 and heated pellet 1430 in FIG. 14 as well as the foamed glass bead 1510 in FIG. 15.

In some embodiments, the preform pellets can also contain particulates that have a higher melting temperature than glass and that are wetted out by the molten glass. The particulates can be suspended in the molten pellets and can contribute to the structure of the final size of the bubbles/voids in the foamed glass beads. In some cases, the particulates can migrate to the vertices where the entrained bubbles/voids meet and can prevent the bubbles/voids from coalescing with each other. The particulates may also alter the viscosity of the molten preform by hindering the flow of molten glass. Lastly, the higher melting point of the particulate can increase the range of the rate at which the beads can be heated and cooled, while not impacting the slower process of the surface energy forming rounded beads.

After the above-referenced materials (glass powder, foaming agent, binding agent, scaling agent, fluxing agent, solvent, and/or particulates) are mixed, the preform pellets can be formed by, for example, using a mold or depositing drops of desired size into a bed, which may include a bead carrier material. In some embodiments, additional bead carrier material may then be added on top of the preform pellets.

As mentioned above, prior to heating/baking, those preform pellets can be dried. For example, in some embodiments, the preform pellets can be air dried after they are formed and before they are heated. The sealing agent, as described above, can allow the solvent (ex: water) to escape from the preform pellets into the bead carrier material and to the atmosphere, while retaining the solid and soluble components in the preform pellets. While the sealing agent is described here as a critical component, it can be omitted if lower compressive strength beads are sufficient for an end-user's goal.

In some embodiments, the preform pellets can be distributed and heated on a granular media (for example, a non-wetting granular media). The granular media (in some cases, a powder) can have a higher melting point than a melting point of the preform pellets such that it retains its solid state and does not mix, blend, or sinter to the pellets. In some cases, the media can also have a higher melting temperature than the highest heat achieved during the heating/baking process. The media may, to the benefit of the glass foamed beads, impart a surface texture on the beads relative to the media's size and contact points. Further, in some cases, the media, even if non-wetting with relation to the preform pellets, may partially wet out to the glass and permanently adhere once cooled. This may be beneficial to the foamed glass beads since the media that is adhered to the surface can offer a texture to the bead that increases the strength of the bond between the cement or other bonding agent and the foamed glass beads. For example, the media can be aluminum hydrate powder or quartz powder or sand. If aluminum hydrate powder is used, the aluminum cations may migrate, altering the skin composition of the final, foamed glass bead to an aluminoborosilicate glass and contributing to the overall compressive strength of the foamed glass bead.

After the preform pellets are dried and distributed on the media, they can be heated to a target temperature until particles of the glass powder are sintered together and the preform pellets become molten beads. The molten beads can then be cooled to create the final, foamed glass beads. Heating can take 5 to 15 minutes ramp time and 5 to 15 minutes at final temperature of time and ranges between approximately 900 degrees Celsius+/−100 degrees (i.e., between 800 and 1000 Celsius).

During heating, the preform pellets can undergo various chemical and phase transitions including the decomposition of some of the subcomponents into gasses and solid material, evaporation of volatile components, and the fluidization of some components. The gasses can coalesce into pockets/bubbles/voids within the beads, and the size and distribution of those pockets/bubbles/voids can be dependent on the concentrations of the constituents of the preform bead paste.

During initial heating, water vapor can be lost from the bead until the three-dimensional bead structure remains. Then, as the bead is heated up to about 550 degrees Celsius, the fluxing agent can become flowable and it can wet the glass and foaming agent to create the preliminary cellular structure, as illustrated in FIG. 9. As mentioned above, the fluxing agent can be a compound of borate. However, other fluxing agents (including sodium silicate) may be used as long as they retain fluidization temperatures between 250 and 750 degrees Celsius so they can adhere to the foaming agent and the glass particles, as illustrated in FIG. 10.

As the preform pellets continue to heat, they reach a temperature where the glass particles soften, and the foaming agent begins to create gasses through physical change and/or thermal decomposition. Therefore, the heating enables the preform pellets to form beads as the surface energy of the molten glass generally pulls the molten bead into the shape of a sphere. The gasses created by the changing/decomposing foaming agent can create evenly distributed, fine, gas bubbles/voids in the glass matrix, as illustrated in FIG. 11, and as the gasses expand and the glass matrix becomes even more flowable, the bubbles can take on a more regular pattern, as illustrated in FIG. 12. As the beads continue to heat, the decomposed components (for example, the silicates from the bentonite, the aluminum and other metal ions from the bentonite, and the boron from the fluxing agent) can reinforce the surface structure of the skin on the exterior of the beads and the interior pockets created by the gas voids, as illustrated in FIG. 13.

To retain the spherical shape formed during heating, the preform pellets may be suspended in a granular media that remains separate from the preform pellets during baking/heating and cooling (as mentioned above, for example, a non-wetting granular media). This enables the foamed glass beads to be separate from the bead carrier material by mechanical means once they are finished heating/baking. In some cases, the foamed glass beads, prior to cooling, may be separate from the bead carrier material. The cooling period enables the glass to stabilize through an annealing process.

As mentioned above, the bubbles/voids formed during heating and decomposition of the hydrated foaming agent can be gas bubbles and/or nucleating sites within the molten beads. The bubbles may be less than 100 microns in diameter. The heating of the fluxing agent during the baking process can allow the glass powder to sinter and combine into continuous, molten glass beads while trapping pockets of ambient air and creating gas in the voids created by the foaming agent that are between the molten, glass powder particles. If allowed to heat long enough, the gas bubbles may eventually combine and exit the molten glass bead or coalesce into larger bubble which are fewer in numbers, which would lead to an unfavorably dense glass bead or a weak bead in the case of fewer large bubbles. Therefore, rapidly heating and subsequent rapid cooling in the range of 5 to 15 minutes of heating and 5 to 15 minutes soak at final temperature of the preforms allows for fine, gas bubbles to be created and trapped in the glass beads. The size and number of the gas bubbles and eventual voids can be controlled by the size of the glass powder particles and the size of the preform pellets. Other factors that can control the size of the gas bubbles/voids are the time baked, temperature, addition of non-melting particles, characteristics of the fluxing and foaming agents, and the cooling rate. The longer the preform is baked for, the more time the gas bubbles have to combine and escape. Additionally, higher temperatures during baking also make it easier for gas bubbles to escape through a less viscous molten glass.

In some cases, the beads may form a skin during or after baking/heating due to the interaction of several layers/constituents. For example, an outer, nonporous skin layer may be derived from the incorporation of the glass powder with the fluxing agent during heating. Alternatively, the silicon dioxide of the glass and the bead carrier media (for ex: aluminum hydrate powder) may contribute to the skin on the bead. In another example, as the exterior bubbles pop during heating, the constituents surrounding those bubbles may stay on the surface and thicken to create the skin.

Alternatively, after the foamed glass beads have been heated for a predetermined amount of time, they can be removed and cooled and, once cooled for either a predetermined amount of time or to a predetermined temperature, a coating can be applied to the final, foamed glass beads. The coating can be a sealant or a primer. For example, gas bubbles near the surface of the molten bead may pop and condense on the exterior of the bead, which can create a skin. A skin can also be formed and/or made thicker by tumbling the still-molten glass beads down an inclined screen after baking. The action of rolling down the screen may cause the outer skin of the beads to compress, causing a shell. A stronger shell that is spherical can be resistant to isostatic pressure.

The final, foamed glass beads can withstand at least 2,000 PSI and, in some cases, over 20,000 PSI. The final beads may be round, which allows for ideal mixing in concrete. The concrete mix can more easily flow around the beads and the beads take up a larger percentage of volume than they would if they were irregularly shaped and with flat sides or sharp edges. Irregularly shaped beads do not roll or slide against each other well and do not pack tightly. Round beads flow well, and they pack tightly, so less cement is needed, and the overall strength of the cured product is stronger. In some embodiments, the foamed glass beads (aggregate) can comprise 85% of the final, finished concrete mixture by volume.

In one aspect, the disclosure provides foamed glass beads made from glass, a hydrated foaming agent, a hydrated binding agent that holds the glass and hydrated foaming agent in solution, a sealing agent, a fluxing agent, and a solvent. The glass can be derived from glass cullet that is ground into glass powder. The glass powder, the hydrated foaming agent, the hydrated binding agent, the sealing agent, the fluxing agent, and the solvent can be mixed together to create a preform material that is pelletized to make preform pellets. The preform pellets can be held together by the hydrated binding agent. The sealing agent can create a barrier throughout the preform pellets to limit migration of soluble and insoluble constituents while allowing the solvent and vapor from the solvent to escape during the drying process. The fluxing agent can lower a melting temperature of the glass powder, create a seal around the glass powder and the hydrated foaming agent, and assist the glass powder in joining together once melted. The hydrated binding agent and the sealing agent can burn off during the heating process. During the heating process, the fluxing agent and the hydrated foaming agent can be incorporated into the glass powder. The preform pellets can be dried and then heated to a predetermined temperature. The heating process creates the final, foamed glass beads.

In some cases, additional changes or steps may be added to the base technology. For example, the foamed glass beads can be further comprised of an outer, nonporous skin layer on the final, foamed glass beads, derived from the incorporation of the glass powder with the fluxing agent. In another example, the interior of the foamed glass beads can be characterized by voids surrounded by walls of a solid matrix. In another example, the hydrated foaming agent can decompose during heating, thereby creating gas bubbles within the glass matrix. The solvent can be water. The hydrated foaming agent can be bentonite. In yet another example, there can be a plurality of sealed pockets of air derived from the incorporation of the glass powder with the fluxing agent, the hydrated foaming agent can cause production of gas during baking, and the gas can migrate to the plurality of sealed pockets of air to enlarge them into bubbles in the preform pellets. The foamed glass beads can have evenly distributed bubbles after they have cooled. The fluxing agent can contain boron and may be selected from the group consisting of sodium borate, sodium tetraborate, disodium tetraborate, and combinations thereof. The sealing agent may be an adhesive compound and may be comprised of polyvinyl acetate, ethanol, water, and acetate. The sealing agent may be an alginate gel and may be created by mixing solutions of sodium alginate and calcium chloride. In another example, the preform pellets can be suspended in a granular media that remains separate from the preform pellets during baking. In another example, the hydrated binding agent can be comprised of a sugar that burns off during heating. Further, the sugar can be selected from the group consisting of xanthan gum, guar gum, and combinations thereof. In yet another example, prior to baking the preform pellets, the glass can be between 93.3% and 99.6% (for ex: 96.5% to 99.2%) by weight, the hydrated foaming agent, pre-hydration, can be between 0.31% and 4.67% (for ex: 0.6% and 2.4%) by weight, the hydrated binding agent, pre-hydration, can be between 0.062% and 1.17% (for ex: 0.12% and 0.6%) by weight, the sealing agent can be between 0% and 0.56% (for ex: 0% and 0.29%) by weight, and the fluxing agent can be between 0.01% and 0.3% (for ex: 0.02% and 0.15%) by weight. Prior to drying, the solvent can be between 20.0% and 50.0% (for ex: 30.0% to 37.6%) by weight.

In another aspect, the disclosure provides a method for manufacturing foamed glass beads, the method comprising hydrating a foaming agent, hydrating a binding agent, mixing a glass powder with the hydrated foaming agent and the hydrated binding agent to create a premix, wherein the glass powder can be of a predetermined mesh size, adding solvent to the premix and mixing to create a flowable preform mixture, mixing a sealing agent into the flowable preform mixture, wherein the sealing agent can dissolve and mix between particles, mixing a fluxing agent into the flowable preform mixture to create a pre-foamed bead paste, pelletizing the pre-foamed bead paste to make preform pellets/beads, heating the preform pellets/beads until particles of the glass powder from the preform pellets/beads are sintered together and the preform pellets/beads become molten beads, and removing the molten beads from the heat to cool them into foamed glass beads.

In some cases, additional changes or steps may be added to the base technology. For example, the method may further comprise drying the preform pellets/beads prior to heating. In another example, the method may further comprise suspending the preform pellets/beads onto a bed of a bead carrier material having a higher melting point than a melting point of the preform pellets/beads, and adding additional bead carrier material on top of the pre-foamed pellets/beads, wherein the bead carrier material can be aluminum hydrate powder. The molten beads may be separated from the bead carrier material by mechanical means. In another example, the hydrated foaming agent can decompose during heating and create nucleating gas sites within the molten beads. Further, the hydrated foaming agent can be bentonite clay and can give off gas when heated, the gas from the bentonite clay can migrate to the nucleating sites to create gas bubbles within the molten pellets, and the fluxing agent can contain boron. In yet another example, the binder can be xanthan gum. The preform beads can be heated up to between 800 and 1000 degrees Celsius.

Embodiment 2

In some embodiments, the aggregate that makes up the foamed glass beads can include a void proxy, which can be ground into a fine powder prior to combining with the glass, water, and/or a binder. The void proxy can cause evenly distributed voids or gas pockets/bubbles to form in the preform pellet during baking, thereby making the glass beads lighter without sacrificing their strength (as might happen with hollow glass beads). In some embodiments, the void proxy creates these gas pockets by vaporizing and leaving behind voids. These voids can function as nucleating sites within each molten preform pellet, which is a location for carbon dioxide or other gas bubbles created during the baking process to migrate or escape to in place of escaping out of the bead. Therefore, the void proxy is effectively a seeding particle that creates small, nucleating sites during baking of the preform pellet, and the nucleating sites are air pockets or bubbles within each glass bead. In other embodiments, the void proxy can simply be the pocket of air that gas from the foaming agent migrates to and expands.

The void proxy can be made by combining a foaming agent and a fluxing agent together and drying the combination. Alternatively, the void proxy can be simply comprised of particles such as wood particles, flour, and corn starch. The void proxy can be insoluble in water and can vaporize during the baking process when temperatures reach approximately 600+ degrees Celsius. In cases where the void proxy is created through the combination of a foaming agent and a fluxing agent that is then dried, the dried void proxy can be crushed into a powder of a predetermined size (or predetermined various sizes). For example, in some embodiments, lithium carbonate (the foaming agent) and sodium silicate (the fluxing agent) can be added together to create lithium powder. The lithium powder can then be ground and/or added to water to create the void proxy. The size(s) and/or amount(s) of the void proxy powder particles can determine the size and/or number of the gas bubbles/pockets within the final, foamed glass beads. Therefore, to increase the number of voids/nucleating sites within each foamed glass bead, more void proxy particles can be added to the preform pellets. The appropriate, corresponding amount of a foaming agent can then inflate the voids/nucleating sites to generate the desired density of the foamed glass bead. If no foaming agent is used, then the desired density and number of bubbles can be achieved if the size of the void proxy particles are the same size as the desired air pockets and the proper amount of void proxy is used. In some cases, the ratio of foamed glass bead to void proxy is approximately a 125:1 volume ratio or a 5:1 diameter ratio.

The foaming agent for the void proxy can be a powdered carbonate such as lithium carbonate. Optionally, the foaming agent can be calcium carbonate. The foaming agent can cause production of carbon dioxide during heating/baking, and the produced carbon dioxide can migrate to the gas pockets (i.e., voids/nucleating sites) to create gaseous bubbles in the molten pellets. The foamed glass beads can, therefore, have evenly distributed bubbles after they have cooled.

The fluxing agent for the void proxy can be a co-alkali activator such as sodium silicate. The fluxing agent can function to lower the melting point at which the glass powder necks and can form an encapsulating bubble around the nucleating sides created by the void proxy. Additionally, by adding the fluxing agent to the foaming agent to create the void proxy, the foaming agent can be prevented from migrating to the edge of preform pellets as they air dry prior to baking. This helps to enable each preform pellet to retain an even distribution of the foaming agent throughout its volume which, in turn, allows the foaming agent to contribute to foaming the bead instead of simply outgassing into the air from the surface of the molten bead. With only a foaming agent instead of the full, void proxy, the foaming agent may migrate to the outside of the preform bead and no longer be evenly dispersed throughout the bead when it is baked. Therefore, the desired low bead density and high number of the bubbles within each foamed glass bead can be achieved by using the proper combination of fluxing agent and foaming agent.

However, in some cases, a bead of a desired density can be approximately made with only a foaming agent (i.e., no fluxing agent is added to the foaming agent). In this case, the gas bubbles may be randomly sized and generally larger compared to if a fluxing agent is used in combination with a foaming agent. This is because most of the gas from the foaming agent may escape during baking and cannot, therefore, contribute to lowering the overall density of the foamed glass bead. One way to address this concern is to microencapsulate the foaming agent. For example, a mixture of acrylic varnish and a foaming agent can be sprayed into the air to allow the mixture droplets time to dry in the air before they fall to the ground, and they can create micro beads of a foaming agent that are not soluble in water. These micro beads can more evenly distribute the nucleating sites in the preform pellets and control the final size of the bubbles in the foamed glass beads.

In addition to glass powder, the void proxy, and water, the glass aggregate can include a binder. In some embodiments, the binder can be sodium silicate or clay, such as bentonite clay. Bentonite clay can create a thick, viscose emulsion that suspends and separates the glass particles, which can then create a homogenous free-flowing mixture, which is ideal for dispensing or forming the preforms. In other embodiments, the binder can be sodium silicate. In cases where sodium silicate is used as the fluxing agent in the void proxy, the sodium silicate used for the void proxy is first added to the foaming agent prior to additional sodium silicate being added to the aggregate for use as a binder. The binder can burn out completely during baking or it can combine with the molten preform. As mentioned above, the binder can comprise approximately less than 1% by weight of the preform pellet prior to heating/baking.

As mentioned above, prior to baking into a final, foamed glass bead, preform pellets are created. The preform pellets can be made from the combination of the glass powder, the void proxy, the water, and the binder, which are mixed together and then formed into pellets. In some embodiments, the preform pellets can also contain particulates that have a higher melting temperature than glass and that are wetted out by the molten glass (for example, aluminum oxide or quartz). The particulates can be suspended in the molten pellets and can contribute to the structure of the final size of the bubbles in the foamed glass beads. In some cases, the particulates can migrate to the vertices where the entrained bubbles meet and can prevent the bubbles from coalescing with each other. The particulates may also alter the viscosity of the molten preform by hindering the flow of molten glass. Lastly, the higher melting point of the particulate can increase the range of the rate at which the beads can be heated and cooled, while not impacting the slower process of the surface energy forming rounded beads.

After the above-referenced materials (glass powder, void proxy, water, binder, and/or particulates) are mixed, the preform pellets can be formed. Prior to heating/baking, those preform pellets can be dried. For example, in some embodiments, the preform pellets can be air dried after they are formed and before they are heated.

In some embodiments, the preform pellets can be distributed and heated on a non-wetting granular media. The non-wetting granular media (in some cases, a powder) can have a higher melting point than a melting point of the preform pellets such that it retains its solid state and does not mix, blend, or sinter to the pellets. In some cases, the non-wetting media can also have a higher melting temperature than the highest heat achieved during the baking process. The non-wetting media may, to the benefit of the glass foamed beads, impart a surface texture on the beads relative to the media's size and contact points. Further, in some cases, the non-wetting media may partially wet out from the glass and permanently adhere once cooled. This may be beneficial to the foamed glass beads since the media that is adhered to the surface can offer a texture to the bead that increases the strength of the bond between the cement and the foamed glass beads. For example, the nonwetting media can be aluminum hydrate powder.

After the preform pellets are dried and distributed on the non-wetting media, they are rapidly baked to create the final, foamed glass beads. Baking takes in the range of 5 to 15 minutes of heating and 5 to 15 minutes soak at final temperature and ranges between approximately 900 degrees Celsius +/−50 degrees. During baking, the preform pellets can form approximate spheres as the surface energy of the molten glass generally pulls the molten bead into the shape of a sphere. Additionally, evenly distributed, fine, gas bubbles can be formed within each molten preform pellet. To retain the spherical shape formed during heating, the preform pellets may be suspended in a non-wetting granular media that remains separate from the preform pellets during baking and cooling.

As mentioned above, the bubbles formed during heating can be carbon dioxide bubbles. They may be less than 100 microns in diameter. The heating and off gassing of the foaming agent during the baking process can allow the glass powder to sinter and combine into continuous, molten glass beads while trapping pockets of ambient air and creating gas in the voids created by the void proxy that are between the molten, glass powder particles. If allowed to heat long enough, the gas bubbles may eventually combine and exit the molten glass bead, which would lead to an unfavorably dense glass bead. Therefore, rapidly heating and subsequent rapid cooling in the range of 5 to 15 minutes of heating and 5 to 15 minutes soak at final temperature of the preforms allows for fine, gas bubbles to be created and trapped in the glass beads. The size and number of the gas bubbles can be controlled by the size of the glass powder particles and the size of the preform pellets. Other factors that can control the size of the gas bubbles are the time baked, temperature, addition of non-melting particles, characteristics of the foaming agent, and the cooling rate. The longer the preform is baked for, the more time the gas bubbles have to combine (becoming fewer and larger) and or escape. Additionally, higher temperatures during baking also make it easier for gas bubbles to escape through a less viscous molten glass.

After the foamed glass beads have been heated for a predetermined amount of time, they can be removed and cooled. Once cooled for either a predetermined amount of time or to a predetermined temperature, a coating can be applied to the final, foamed glass beads. The coating can be a sealant or a primer. In some cases, after baking, the beads may form a skin during or after baking. For example, gas bubbles near the surface of the molten bead may pop and condense on the exterior of the bead, which can create a skin. A skin can also be formed and/or made thicket by tumbling the still-molten glass beads down an inclined screen or surface after baking. The action of rolling down the screen may cause the outer skin of the beads to compress, causing a shell. A stronger shell that is spherical can be resistant to isostatic pressure.

The final, foamed glass beads can withstand at least 2,000 PSI and, in some cases, over 20,000 PSI. The final beads may be round, which allows for ideal mixing with concrete or other applications where flowability is desired, such as fracking sand. The concrete mix can more easily flow around the beads and the beads take up a larger percentage of volume than they would if they were irregularly shaped and with flat sides or sharp edges. Irregularly shaped beads do not roll or slide against each other well and do not pack tightly. Round beads flow well, and they pack tightly, so less cement or bonding agent is needed and the overall strength of the cured product is stronger. In some embodiments, the foamed glass beads (aggregate) can comprise 85% of the final, finished concrete mixture.

In one aspect, the disclosure provides foamed glass beads made from glass; a void proxy comprised of a foaming agent and a fluxing agent; water; and a binder. The glass can be derived from glass cullet that is ground into glass powder, the foaming agent and the fluxing agent can be added together and dried to create the void proxy, the glass powder, the void proxy, the water, and the binder can be mixed together to create a preform material that is pelletized to make preform pellets, and the preform pellets can be baked to create the final, foamed glass beads.

In some cases, additional changes or steps may be added to the base technology. For example, the foamed glass beads can be further comprised of a coating on the final, foamed glass beads, and the coating can be applied after the preform pellets are baked. In another example, the void proxy can be ground into a fine powder prior to combining with the glass, water, or binder. In another example, the void proxy may be insoluble in water. In yet another example, the void proxy can cause evenly distributed gas pockets to form in the preform pellet during baking by vaporizing and leaving behind the gas pockets. The foaming agent may be lithium carbonate. In another example, the foaming agent can cause production of carbon dioxide during baking, and the carbon dioxide can migrate to the gas pockets to create bubbles in the preform pellets. Further, the foamed glass beads can have evenly distributed bubbles after they have cooled. In another example, the fluxing agent can be sodium silicate. In yet another example, prior to baking the preform pellets, the void proxy can be between 0.25% and 1.00% by weight, the water can be between 30% and 50% by weight, and the binder can be less than 1% by weight. In another example, the preform pellets can be suspended in a non-wetting granular media that remains separate from the preform pellets during baking. In yet another example, the preform pellets can form spheres when heated during baking.

In another aspect, the disclosure provides a method for manufacturing foamed glass beads, the method comprising adding a foaming agent to a fluxing agent to create a void proxy; drying the void proxy; crushing the void proxy into a powder; adding water to the powder void proxy and mixing to create a primary preform mixture; mixing the glass powder into the primary preform mixture to make a secondary preform mixture; mixing a binder into the secondary preform mixture to create a final preform mixture; pelletizing the final preform mixture to make preform pellets; heating the preform pellets until particles of the glass powder from the preform pellets are sintered together and the preform pellets become molten beads; and removing the molten beads from the heat to cool them into foamed glass beads.

In some cases, further steps or clarification of composition may occur. For example, the method may include the additional step of drying preform pellets prior to heating. In another example, the preform pellets can be heated on a non-wetting granular media, and the non-wetting granular media can have a higher melting point than a melting point of the preform pellets. In yet another example, the void proxy may vaporize during heating and create nucleating sites within the molten beads. Further, the foaming agent can be lithium carbonate and can give off carbon dioxide when heated, the carbon dioxide from the lithium carbonate can migrate to the nucleating sites to create gas bubbles within the molten pellets, and the fluxing agent can be sodium silicate. In some cases, the binder can be sodium silicate. In another example, the method may include the additional step of adding a coating onto the foamed glass beads. In some cases, the void proxy can be between 0.25% and 1.00% by weight, the water can be between 30% and 50% by weight, and the binder can be less than 1.00% by weight.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A method for manufacturing foamed glass beads, the method comprising:
   hydrating a foaming agent;
   hydrating a binding agent;
   mixing a glass powder with the hydrated foaming agent and the hydrated binding agent to create a premix, wherein the glass powder is of a predetermined mesh size;
   adding solvent to the premix and mixing to create a flowable preform mixture;
   mixing a sealing agent into the flowable preform mixture, wherein the sealing agent dissolves and mixes between particles;
   mixing a fluxing agent into the flowable preform mixture to create a pre-foamed bead paste;
   pelletizing the pre-foamed bead paste to make preform pellets;
   heating the preform pellets until particles of the glass powder from the preform pellets are sintered together and the preform pellets become molten beads; and
   removing the molten beads from the heat to cool them into foamed glass beads.

2. The method of claim 1, wherein interiors of each of the foamed glass beads are characterized by voids surrounded by walls of a solid matrix.

3. The method of claim 1, wherein the solvent is water.

4. The method of claim 1, wherein the hydrated foaming agent is bentonite.

5. The method of claim 1, wherein the fluxing agent contains boron and is selected from the group consisting of sodium borate, sodium tetraborate, disodium tetraborate, and combinations thereof.

6. The method of claim 1, wherein the sealing agent is an adhesive compound, and the adhesive compound is comprised of polyvinyl acetate, ethanol, water, and acetate.

7. The method of claim 1, wherein the sealing agent is an alginate gel.

8. The method of claim 7, wherein the alginate gel is created by mixing solutions of sodium alginate and calcium chloride.

9. The method of claim 1, wherein prior to heating the preform pellets,
   the glass powder is between 93.3% and 99.6% by weight,
   the foaming agent is, pre-hydration, between 0.31% and 4.67% by weight,
   the binding agent is, pre-hydration, between 0.062% and 1.17% by weight,
   the sealing agent is up to 0.56% by weight, and
   the fluxing agent is between 0.01% and 0.3% by weight.

10. The method of claim 9, wherein the glass powder is 96.5% to 99.2% by weight.

11. The method of claim 9, wherein the foaming agent is, pre-hydration, between 0.6% and 2.4% by weight.

12. The method of claim 9, wherein the binding agent is, pre-hydration, between 0.12% and 0.6% by weight.

13. The method of claim 9, wherein the sealing agent is up to 0.29% by weight.

14. The method of claim 9, wherein the fluxing agent is between 0.02% and 0.15% by weight.

15. The method of claim 1, wherein the preform pellets are suspended in a granular media that remains separate from the preform pellets during heating.

16. The method of claim 1, wherein the hydrated binding agent is comprised of a sugar that burns off during heating, and the sugar is selected from the group consisting of xanthan gum, guar gum, and combinations thereof.

17. The method of claim 1, further comprising drying the preform pellets prior to heating.

18. The method of claim 17, wherein, prior to drying the preform pellets, the solvent is between 20.0% and 50.0% by weight.

19. The method of claim 18, wherein, prior to drying the preform pellets, the solvent is between 30.0% and 37.6% by weight.

20. The method of claim 1, further comprising suspending the preform pellets onto a bed of a bead carrier material having a higher melting point than a melting point of the preform pellets; and adding additional bead carrier material on top of the preform pellets, wherein the bead carrier material is aluminum hydrate powder.

21. The method of claim 20, wherein the molten beads are separated from the bead carrier material by mechanical means.

22. The method of claim 1, wherein the hydrated foaming agent decomposes during heating and creates nucleating gas sites within the molten beads.

23. The method of claim 22, wherein
   the hydrated foaming agent is bentonite clay and gives off gas when heated,
   the gas from the bentonite clay migrates to the nucleating sites to create gas bubbles within the molten beads, and
   the fluxing agent contains boron.

24. The method of claim 23, wherein the foamed glass beads have evenly distributed bubbles after they have cooled.

25. The method of claim 1, wherein the hydrated binding agent is xanthan gum.

26. The method of claim 1, wherein the preform pellets are heated up to between 800 Celsius and 1000 Celsius.

\* \* \* \* \*